United States Patent
Trevett et al.

(10) Patent No.: US 10,933,451 B2
(45) Date of Patent: Mar. 2, 2021

(54) ULTRASONIC FLUID CLEARING SYSTEMS

(71) Applicant: EchoVista GmbH, Seligenstadt (DE)

(72) Inventors: David Trevett, Poole (GB); Patrick Trevett, Poole (GB); Mincheol Shin, Eastleigh (GB)

(73) Assignee: EchoVista GmbH, Seligenstadt (DE)

( * ) Notice: Subject to any disclaimer, the term of this patent is extended or adjusted under 35 U.S.C. 154(b) by 0 days.

(21) Appl. No.: 16/334,012

(22) PCT Filed: Sep. 14, 2017

(86) PCT No.: PCT/EP2017/073211
§ 371 (c)(1),
(2) Date: Mar. 17, 2019

(87) PCT Pub. No.: WO2018/050786
PCT Pub. Date: Mar. 22, 2018

(65) Prior Publication Data
US 2019/0255577 A1    Aug. 22, 2019

(30) Foreign Application Priority Data
Sep. 16, 2016 (GB) .................................. 1615809

(51) Int. Cl.
*B08B 7/02* (2006.01)
*B06B 1/06* (2006.01)
*B23Q 11/08* (2006.01)
*B60S 1/02* (2006.01)
*G02B 27/00* (2006.01)

(52) U.S. Cl.
CPC ............ *B08B 7/028* (2013.01); *B06B 1/0622* (2013.01); *B23Q 11/08* (2013.01); *B60S 1/02* (2013.01); *G02B 27/0006* (2013.01); *B06B 2201/77* (2013.01)

(58) Field of Classification Search
CPC .... B08B 7/028; B06B 1/0622; B06B 2201/77; B23Q 11/08; G02B 27/0006
USPC ........................................................ 134/184
See application file for complete search history.

(56) References Cited

FOREIGN PATENT DOCUMENTS

| DE | 10103197 | 7/2002 |
|---|---|---|
| GB | 2387107 | 10/2003 |
| WO | WO 2012/095643 | 7/2012 |

(Continued)

OTHER PUBLICATIONS

International Search Report and the Written Opinion dated Jan. 24, 2018 From the International Searching Authority Re. Application No. PCT/EP2017/073211. (15 Pages).

*Primary Examiner* — Tinsae B Ayalew

(57) ABSTRACT

A system comprises a plate (235) and one or more transducers (200) coupled to the plate (235). Each of the one or more transducers (200) is operable to generate ultrasonic waves which propagate through the plate (235) in a propagation direction (240), for ultrasonically clearing droplets (250) of fluid from the plate (235). The plate (235) comprises one or more structures disposed in the path of ultrasonic waves and configured to control the propagation of ultrasonic waves in the plate (235) to achieve a predetermined amount of ultrasonic wave energy propagating in a direction opposite to the propagation direction (240). The value of one or more parameters of the shape of each of the one or more structures is predetermined to achieve a predetermined effect on ultrasonic waves incident on the structure.

17 Claims, 6 Drawing Sheets

(56) References Cited

FOREIGN PATENT DOCUMENTS

WO     WO-2012095643 A1 *   7/2012    ............... B08B 3/12
WO     WO 2015/011064     1/2015

* cited by examiner

ULTRASONIC FLUID CLEARING SYSTEMS

RELATED APPLICATIONS

This application is a National Phase of PCT Patent Application No. PCT/EP2017/073211 having International filing date of Sep. 14, 2017, which claims the benefit of priority of United Kingdom Patent Application No. 1615809.9 filed on Sep. 16, 2016. The contents of the above applications are all incorporated by reference as if fully set forth herein in their entirety.

The present invention relates to a system comprising a plate and an apparatus for ultrasonically clearing droplets of fluid from the plate. The plate may, for example, be a machine tool window and the fluid may be a cutting fluid.

FIELD AND BACKGROUND OF THE INVENTION

A machine tool uses cutting fluid to lubricate and cool a cutting tool whilst it works on a metal work piece being shaped by the tool. The metal cut from the piece, known as swarf, can be a danger to the operator of the machine and there is also a risk that the cutting tool will break and that too is a risk to the operator. To protect the operator, the whole machine tool, or at least the region around the cutting tool is enclosed in a housing. The housing has a window so the operator can see how the cutting operation is progressing. However, cutting fluid sprays inside the housing and onto the window obscuring the operator's view. Cutting fluid may comprise water and various additives or oil and various additives.

It is known to provide a window in the form of a circular disk which is rotated by an electric motor; cutting fluid which falls onto the window is thrown off due to the rotation of the disc giving the operator a clearer view. In one example a circular frame supports a motor to which the disc is fixed. The periphery of the disc is sealed to the frame to prevent leakage of cutting fluid. Such windows are small, heavy and complicated.

It has therefore been proposed in WO2015/011126 to use ultrasonic waves to clear fluid from a machine tool window.

SUMMARY OF THE INVENTION

According to one aspect of the present invention, there is provided a system comprising a plate having a bulk bounded by a first surface, a second surface opposite to the first surface, and at least one edge extending between the first and second surfaces; and one or more transducers coupled to the plate, each of the one or more transducers being operable to generate ultrasonic waves which propagate through the plate in a propagation direction, for ultrasonically clearing droplets of fluid from the plate. The plate comprises one or more structures disposed in the path of ultrasonic waves generated by the one or more transducers, the one or more structures being configured to control the propagation of ultrasonic waves in the plate to achieve a predetermined amount of ultrasonic wave energy propagating in a direction opposite to the propagation direction of the ultrasonic waves generated by the one or more transducers. The value of one or more parameters of the shape of each of the one or more structures is predetermined to achieve a predetermined effect on ultrasonic waves incident on the structure.

Optionally, the one or more transducers is comprised in an apparatus for ultrasonically clearing droplets of fluid from the plate. Such an apparatus may further comprise a generator for providing ultrasonic drive signals to the one or more transducers.

Optionally, the one or more parameters comprises any one or more of: height of the structure in a direction perpendicular to the first surface and/or the second surface; length of the structure in a direction perpendicular to the propagation direction of the ultrasonic waves generated by the one or more transducers; distance of the structure from the one or more transducers, along a direction of propagation of the ultrasonic waves generated by the one or more transducers; angle of the structure relative to the first surface and/or the second surface; angle of the structure relative to the direction of propagation of the ultrasonic waves generated by the one or more transducers; shape of a surface of the structure; curvature of a surface of the structure.

Optionally, the one or more transducers is coupled to a surface of the plate and is operable to generate ultrasonic waves which propagate through the bulk of the plate.

Optionally, the one or more structures is configured to scatter, absorb, and/or reflect at least some ultrasonic wave energy incident on the one or more structures.

Optionally, the one or more structures comprises a discontinuity in the material of the plate, which extends substantially between the first and second surfaces, and has a length in a direction angled to the propagation direction of the ultrasonic waves generated by the one or more transducers. The discontinuity may have a length in a direction perpendicular to the propagation direction. The value of one or more parameters of the shape of the discontinuity may, for example, be predetermined to achieve the predetermined effect on ultrasonic waves incident on the one or more structures. The discontinuity may, for example, comprises one of: an edge of the plate; a hole extending through the plate between the first and second surfaces; a void in the bulk of the plate; a region of the bulk of the plate having different material properties to an immediately adjacent region.

Optionally, the structure has a length in the direction perpendicular to the propagation direction of the ultrasonic waves generated by the one or more transducers which is substantially equal to a length of the plate in the direction perpendicular to the propagation direction of the ultrasonic waves generated by the one or more transducers.

Optionally, the plate comprises a first edge and a second edge opposite the first edge, and the one or more transducers are attached to the plate relatively close to the first edge and relatively far away from the second edge and are configured to generate ultrasonic waves which propagate in a main propagation direction towards the second edge.

Optionally, the one or more structures comprises at least one absorbing structure, wherein the at least one absorbing structure is disposed at or near the second edge and is configured to reduce an amount of reflected ultrasonic wave energy propagating in a direction opposite to the main propagation direction, as compared to an amount of reflected ultrasonic wave energy that would propagate in the absence of the at least one absorbing structure. The at least one absorbing structure may, for example, be configured to scatter a predetermined amount of incident ultrasonic wave energy. The predetermined amount of scattered incident ultrasonic energy may, for example, be set so as to achieve a predetermined ratio of standing ultrasonic waves to travelling ultrasonic waves in the plate.

Optionally, the at least one absorbing structure comprises a plurality of holes in the bulk of the plate, the holes extending substantially between the first and second surfaces. The holes may, for example, be arranged in a predetermined pattern adjacent to the second edge.

Optionally, the at least one absorbing structure comprises a discontinuity in the bulk of the plate, extending substantially between the first and second surfaces. Such a discontinuity may, for example, have a waveform shape such that a distance along the propagation direction between the discontinuity and the first edge is variable along an axis perpendicular to the main propagation direction. The shape of the discontinuity may, for example, be such that an angle of incidence of ultrasonic waves generated by the one or more transducers is variable along the length of the discontinuity in the direction perpendicular to the main propagation direction. Optionally, the discontinuity comprises the second edge of the plate.

Optionally, the one or more transducers is configured to generate ultrasonic waves propagating in a secondary propagation direction towards the first edge, and the one or more structures comprises at least one amplifying structure which is disposed at or near the first edge and is configured to increase an amount of reflected ultrasonic wave energy propagating in a direction opposite to the secondary propagation direction, as compared to an amount of reflected ultrasonic wave energy that would propagate in the absence of the at least one amplifying structure. The at least one amplifying structure may, for example, be configured to reflect a predetermined amount of incident ultrasonic wave energy. The predetermined amount of reflected incident ultrasonic energy may be set so as to achieve constructive interference between the ultrasonic waves reflected by the at least one amplifying structure and waves generated by the one or more transducers propagating in the plate in the main propagation direction between the one or more transducers and the second edge. The predetermined amount of reflected incident ultrasonic energy may, for example, be set so as to achieve a predetermined amplitude of waves propagating in the plate in the main propagation direction between the one or more transducers and the second edge.

Optionally, the at least one amplifying structure comprises a planar discontinuity in the bulk of the plate, extending substantially between the first and second surfaces of the plate, the plane of the discontinuity being perpendicular to the secondary propagation direction and perpendicular to each of the first and second surfaces. Optionally, the discontinuity comprises the first edge of the plate.

Optionally, the one or more structures comprises at least one guiding structure which is disposed between the one or more transducers and the second edge and is configured to alter the propagation direction of ultrasonic waves propagating in the plate. The at least one guiding structure may, for example, be configured to direct ultrasonic waves toward a predetermined region of the plate to cause constructive interference in the predetermined region, such that the amplitude of ultrasonic waves propagating in the predetermined region is greater than the amplitude of ultrasonic waves propagating in regions of the plate adjacent the predetermined region. Optionally, the at least one guiding structure comprises a discontinuity in the bulk of the plate, extending substantially between the first and second surfaces of the plate.

Optionally, the one or more transducers is operable to generate ultrasonic waves in the plate at a predetermined frequency in the range 300 kHz to 5 MHz and the generator is operable to provide ultrasonic drive signals to the one or more transducers for the predetermined frequency.

Optionally, the apparatus is configured such that the waves generated in the plate comprise Lamb waves.

Optionally, the generator is arranged to apply ultrasonic drive signals to the transducer(s) in pulses.

Optionally, the plate comprises a window of a machine tool, and the fluid comprises a cutting fluid.

A second aspect of the invention provides a machine tool comprising a system according to the first aspect.

A third aspect of the invention provides a method of clearing fluid from a plate having a bulk bounded by a first surface, a second surface opposite to the first surface, and at least one edge extending between the first and second surfaces. The method comprises: generating ultrasonic waves in the plate using one or more ultrasonic transducers coupled to the plate such that the generated ultrasonic waves propagate in the plate in a propagation direction; and controlling the propagation of ultrasonic waves in the plate to achieve a predetermined amount of ultrasonic wave energy propagating in a direction opposite to the propagation direction.

Optionally, the method comprises propelling droplets of the fluid across a surface of the plate.

Optionally, the plate is a plate of the first aspect, the ultrasonic waves are generated using the apparatus of the first aspect and the propagation of the ultrasonic waves is controlled using the one or more structures of the first aspect.

A fourth aspect of the invention provides a system comprising a plate having a bulk bounded by a first surface, a second surface opposite to the first surface, and at least one edge extending between the first and second surfaces; and one or more transducers couplable to the plate, each of the one or more transducers being operable to generate ultrasonic waves which propagate through the plate in a propagation direction, for ultrasonically clearing droplets of fluid from the plate. The plate comprises one or more structures disposed in the path of ultrasonic waves generated by the one or more transducers, the one or more structures being configured to control the propagation of ultrasonic waves in the plate to achieve a predetermined amount of ultrasonic wave energy propagating in a direction opposite to the propagation direction of the ultrasonic waves generated by the one or more transducers. The value of one or more parameters of the shape of each of the one or more structures is predetermined to achieve a predetermined effect on ultrasonic waves incident on the structure.

A fifth aspect of the invention provides a method of providing a plate having one or more structures disposed in a path of ultrasonic waves propagating through the plate for ultrasonically clearing droplets of fluid from the plate. The method comprises determining a value of one or more parameters of a shape of each of the one or more structures to achieve a predetermined effect on ultrasonic waves incident on the structure, and determining a configuration of the one or more structures to achieve a predetermined amount of ultrasonic wave energy propagating in a direction opposite to a propagation direction of the ultrasonic waves propagating through the plate. The method comprises providing a plate having a bulk bounded by a first surface, a second surface opposite to the first surface, at least one edge extending between the first and second surfaces, and one or more structures in accordance with the determined value and configuration.

A sixth aspect of the invention provides a method comprising determining a value of one or more parameters of a shape of each of one or more structures disposed in a path of ultrasonic waves propagating through a plate for ultrasonically clearing droplets of fluid from the plate. The value of the one or more parameters are determined to achieve a predetermined effect on ultrasonic waves incident on the structure. The method comprises determining a configuration of the one or more structures to achieve a predetermined amount of ultrasonic wave energy propagating in a direction opposite to a propagation direction of the ultrasonic waves propagating through the plate, such that a plate can be provided having a bulk bounded by a first surface, a second surface opposite to the first surface, at least one edge extending between the first and second surfaces, and one or more structures in accordance with the determined value and configuration.

A seventh aspect of the invention provides a window having a bulk bounded by a first surface, a second surface opposite to the first surface, and at least one edge extending between the first and second surfaces. The window comprises one or more structures disposed in a path of ultrasonic waves propagating through the window for ultrasonically clearing droplets of fluid from the window, the one or more structures being configured to achieve a predetermined amount of ultrasonic wave energy propagating in a direction opposite to a propagation direction of the ultrasonic waves propagating through the window. The value of one or more parameters of the shape of each of the one or more structures is predetermined to achieve a predetermined effect on ultrasonic waves incident on the structure.

BRIEF DESCRIPTION OF THE SEVERAL VIEWS OF THE DRAWINGS

Various features and advantages of certain examples will be apparent from the description which follows, taken in conjunction with the accompanying drawings, which together illustrate, by way of example only, a number of features, and wherein.

DESCRIPTION OF SPECIFIC EMBODIMENTS OF THE INVENTION

Figure 1:
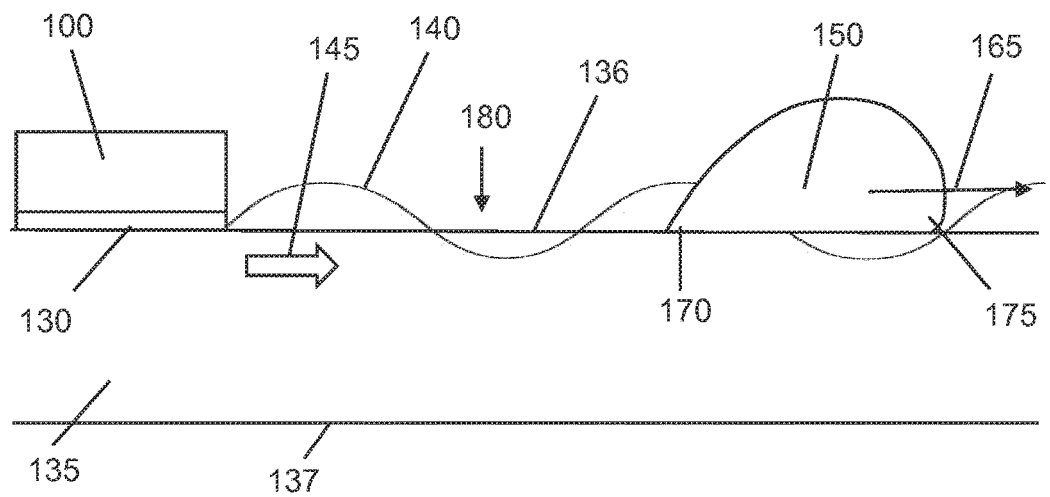
FIG. 1 is a schematic illustration showing by way of example a transducer emitting ultrasonic waves through a droplet of cutting fluid on a plate.

The following disclosure describes example systems comprising a plate (or sheet of material) and an apparatus for ultrasonically clearing droplets of fluid from the plate. In the examples the apparatus comprises one or more transducers coupled to the plate, each operable to generate ultrasonic waves which propagate through the plate; and a generator for providing ultrasonic drive signals to the one or more transducers. In the examples the plate may comprise one or more structures disposed in the path of ultrasonic waves generated by the one or more transducers. The one or more structures may be configured to control the propagation of ultrasonic waves in the plate, for example to achieve a predetermined amount of ultrasonic wave energy propagating in a direction opposite to the propagation direction of the ultrasonic waves generated by the one or more transducers. The structures may therefore advantageously enable certain aspects or parameters of the ultrasonic waves propagating in the plate to be altered or modified as compared to the situation without the structures present. For example, the one or more structures may be configured to increase the energy carried by the ultrasonic waves, to focus the ultrasonic waves into a selected region, and/or to minimize or prevent the formation of standing waves. The examples described herein may be advantageously implemented, for example, by a system for ultrasonically clearing fluid from a machine tool window.

An example machine tool window comprises a plate of transparent material, e.g. glass, which may be toughened glass. Clearing droplets of cutting fluid from the window may be achieved by examples of the present invention using ultrasonic waves, for example using example apparatus described herein. Such example apparatus may in general comprises one or more piezoelectric transducers fixed to the plate and circuitry for operating the transducers to apply ultrasonic waves to the plate. The example apparatus may also be used to clear fluid from other types of plates, such as vehicle windows comprising a laminate layer sandwiched between a top and bottom layer of glass.

The surface of a plate to be cleared by the examples may be treated, for example by applying an optional coating that modifies the surface tension between fluid deposit on the plate and the plate surface. Such a coating may tend to repel the fluid. For example the coating may reduce surface tension. For water based fluid a hydrophobic coating may be used.

The term "ultrasonic" or "ultrasonically" is used to refer to waves having an ultrasonic frequency. An ultrasonic frequency may be any frequency higher than the upper audible limit of human hearing (approximately 20 kiloHertz (kHz)). Systems of the present disclosure may employ any ultrasonic frequency. Some example systems described herein may employ one or more ultrasonic frequencies within the range 100 kHz to 50 MegaHertz (MHz) or higher. Some example systems described herein may employ one or more frequencies within the range 300 kHZ to 5 MHz. The ultrasonic waves are emitted from a transducer coupled to a signal generator. The generator may be a signal generator configured to provide an electrical signal of ultrasonic frequency to the transducer. The transducer is arranged to be driven for generating ultrasonic waves based on the ultrasonic signals from the generator. The signal generators comprised in the example systems described herein may be of any suitable design known in the art.

In certain examples described herein, a transducer is configured such that it is capable of emitting waves at one or more ultrasonic frequencies. Clearing a plate may be achieved using one or more transducers. Each of the one or more transducers described herein comprises a plurality of electrodes. Each transducer is configured (e.g. by having a selected number, size and spacing of electrodes) to operate at a predetermined frequency or frequency range. The transducers comprised in the example systems described herein may be of any suitable design known in the art (such as, for example, piezoelectric transducers).

The term "a", "one" or "single" frequency used throughout this description should be interpreted as relating to a central frequency or main frequency emitted from the transducer, since a band of frequencies will be emitted having a bandwidth around a central frequency.

The ultrasonic waves emitted by example systems according to the invention may comprise any type of ultrasonic wave which can propagate through a plate, and in some examples may comprise a combination of different wave types. The wave-type of the ultrasonic waves emitted in a given example may depend on properties of the particular plate, such as the thickness of the plate. Examples of different wave-types which may propagate through a plate include surface acoustic waves, Rayleigh waves, Lamb waves and plate waves.

Example systems according to the invention may clear fluid from a surface of a plate by using ultrasonic waves to atomize, propel or vibrate fluid droplets, or any combination of these mechanisms. For example a fluid droplet may be atomized to completely or partially remove it from the surface of the plate. If partially atomized, the remaining part of the droplet may be cleared by propulsion and/or vibration. For example, the droplet of fluid may be propelled along the surface of the plate to move the droplet towards an edge of the plate.

Certain examples will now be described with reference to the Figures. Use of the same reference numeral in a set of Figures for a particular feature relates to the same feature.

FIG. 1 shows an example system comprising a plate 135 having a bulk bounded by a first surface 136, a second surface 137 opposite to the first surface, and at least one edge (not shown) extending between the first and second surfaces. The system further comprises an apparatus for ultrasonically clearing droplets of fluid from the plate 135. The apparatus comprises a transducer 100 (which may be one of multiple transducers comprised in the apparatus 100) coupled to the plate 135 which is operable to generate ultrasonic waves which propagate through the plate 135, and a generator (not shown) for providing ultrasonic drive signals to the transducer 100. The transducer is configured to emit ultrasonic waves 140 in the direction indicated by the arrow 145. A droplet of fluid 150 (e.g. cutting fluid) is present on the first surface 136 of the plate 135.

The transducer 100 is coupled to the plate 135 by attaching the transducer 100 to a surface of the plate 135. In examples in which the plate 135 comprises a machine tool window, the transducer 100 is attached to the window on the inside of the housing; i.e. on the side of the window which is wetted by cutting fluid. However; if the window is sufficiently thin it is also possible to attach the transducer 100 to the window on the outside of the housing. This may be desirable because it protects the transducer 100 from being damaged by contact with the cutting fluid.

Attaching the transducer 100 to the plate surface may be achieved by chemical bonding, or physical fixing, of the transducer to the plate surface. Suitable bonding agents may be commercially available, for example this may include epoxy resin. In use the bonding agent forms a bonding layer 130 between the transducer 100 and plate surface. This bonding layer 130 may be thin, have a uniform thickness and be free from gas bubbles, for example being prepared under vacuum conditions. In examples in which the transducer 100 comprises a piezoelectric transducer, the transducer 100 may be attached to the plate 135 with its electrodes facing the plate surface, or alternatively attached such that its electrodes face away from the plate surface. Having electrodes facing the plate 135 increases the wave energy applied to the plate 135 but also increases the difficulty of providing electrical connections to the electrodes.

In examples described herein the transducer 100 may be configured (or configurable) to operate at any ultrasonic frequency. In some examples the transducer 100 is configured to emit ultrasonic waves having a frequency in the range from 200 kHz to 5 MHz. In some examples the transducer is configured to emit ultrasonic waves having a frequency in the range from 500 kHz to 5 MHz. The example of FIG. 1 shows only one transducer 100 coupled to the plate surface, however any number of transducers may be coupled to the plate surface. The one or more transducers may be coupled near the edge of the plate 135 or in a peripheral region of the plate. In some examples a plurality of transducers is arranged in a line parallel to an edge of the plate 135, at a predetermined distance from the edge of the plate 135.

The ultrasonic waves 140 emitted by the transducer 100 propagate through the plate 135 towards the droplet of fluid 150. The ultrasonic waves 140 are coupled to the first surface 136 of the plate 135, meaning that when they arrive at the droplet of fluid 150 the ultrasonic waves 140 "see" the droplet of fluid 150 and energy is transferred from the ultrasonic waves 140 to the droplet of fluid 150.

In general, high frequency ultrasonic waves possess more energy than low frequency ultrasonic waves. There will therefore be a minimum atomisation frequency associated with a given plate/apparatus system, representing the lowest frequency at which atomization of droplets on the plate is achievable in that system. Below the minimum atomization frequency the ultrasonic waves may not possess enough energy to atomise droplets on the plate. However; the ultrasonic waves may possess enough energy for propulsion of droplets along the plate surface. There will also be a minimum propulsion frequency associated with the given plate/apparatus system, representing the lowest frequency at which propulsion of droplets is achievable in that system. However; vibration of droplets of fluid will be possible at least at some frequencies below the minimum propulsion frequency. A minimum vibration frequency may also exist for the system, representing the lowest frequency at which vibration of droplets on the plate is achievable.

The minimum atomization frequency, the minimum propulsion frequency and the minimum vibration frequency may depend upon the size and/or composition of the droplets of fluid on the plate. For example, smaller droplets have a larger surface area to volume ratio than larger droplets, hence the smaller droplets have a larger surface tension. This means that smaller droplets require larger amounts of energy (from higher ultrasonic frequencies) to overcome surface tension before propulsion or atomisation may be achieved. Higher ultrasonic frequencies may therefore be required to atomize and propel smaller droplets in comparison to larger droplets.

In the illustrated example of FIG. 1, the droplet of fluid 150 may be cleared by atomization, propulsion, vibration, or any combination of these mechanisms. For example, the droplet 150 may be atomized to completely or partially remove it from the surface of the plate 135. If partially atomized, the remaining part of the droplet 150 may be cleared by propulsion and/or vibration. For example, the droplet of fluid 150 may be propelled along the surface of the plate 135 to move the droplet 150 towards an edge of the plate 135. In some cases propulsion alone, vibration alone, or a combination of propulsion and vibration may be sufficient to clear droplets from a plate without atomisation.

In operation of the apparatus shown in FIG. 1, the ultrasonic waves 140 emitted from the transducer 100 propagate within the plate 135 in the direction indicated by the arrow 145. The droplet 150 present on the plate surface is encountered by the ultrasonic waves 140 propagating through the plate 135. This causes energy from the ultrasonic waves 140 to be transferred to the droplet 150, e.g. by mode conversion of the ultrasonic waves 140. Longitudinal waves are thereby transmitted into the droplet 150. The longitudinal waves have the effect of exerting pressure on the inner surface of the droplet 150.

The pressure exerted on the inner surface of the droplet 150 by the mode converted longitudinal waves causes the droplet 150 to be propelled along the plate surface, in the same direction as the propagation direction of the ultrasonic waves 140. When the droplet 150 is propelled along the plate surface the shape of the droplet 150 may change from a symmetric shape (not shown) to an asymmetric shape such as the shape shown in FIG. 1. For example, as shown in FIG. 1, the droplet 150 may change shape such that it has a trailing end 170 and a leading edge 175. The trailing end 170 and the leading edge 175 may have different contact angles with the plate surface. For example, the trailing end 170 may have a larger contact angle with the plate surface in comparison to the leading edge 175.

The example of FIG. 1 treats the plate 135 through which the ultrasonic waves 140 are propagating as if it is infinite. However; in reality the plate 135 has edges, which affect the propagation of ultrasonic waves in the plate 135. In particular, any given plate may be considered to have a bulk bounded by a comprise a plate having a bulk bounded by a first surface, a second surface opposite to the first surface, and at least one edge extending between the first and second surfaces. In examples in which the plate is a four-sided window, the plate will have a bulk bounded by a first surface, a second surface opposite and parallel to the first surface, and two pairs of opposite edges extending between the first and second surfaces.

When ultrasonic waves propagating through such a plate encounter an edge, at least some of the wave energy will be reflected by the edge. If the edge is perpendicular to the propagation direction of the ultrasonic waves, then the reflected waves will be reflected back towards the transducer. The reflected waves will interact with the outgoing waves emitted by the transducer. Such interaction may comprise, for example, constructive or destructive interference, or a combination of constructive and destructive interference. Constructive interference may increase the amplitude of the ultrasonic waves propagating in the plate, and may therefore increase the energy carried by those ultrasonic waves. This may be advantageous, e.g. to increase the energy transferred to droplets on the plate and thereby to enable atomization and/or propulsion of the droplets at relatively lower ultrasonic frequencies than would otherwise be possible. Destructive interference may have the opposite effect, and it may therefore be desired to minimize reflections which cause destructive interference.

In some situations interference between outgoing and reflected ultrasonic waves can create standing ultrasonic waves in the plate. Propulsion of droplets along the plate surface requires the ultrasonic waves to be travelling through the plate (droplets on the plate will then be propelled in the direction of travel of the ultrasonic waves). The existence of a standing wave can impede or prevent propulsion of droplets along the plate surface by the outgoing ultrasonic waves, e.g. because a given droplet may become stalled at a node of the standing wave. It may therefore be desired to minimize reflections which cause standing waves to form in the plate.

The propagation of ultrasonic waves in a plate can be controlled by providing one or more suitably configured structures in the path of the ultrasonic waves. Such structures can, depending on their configuration, reflect, scatter and/or absorb incident ultrasonic waves. Such structures may thereby be configured to achieve a predetermined amount of ultrasonic wave energy propagating in a direction opposite to the propagation direction of ultrasonic waves generated by one or more transducers coupled to the plate.

Figure 2A:
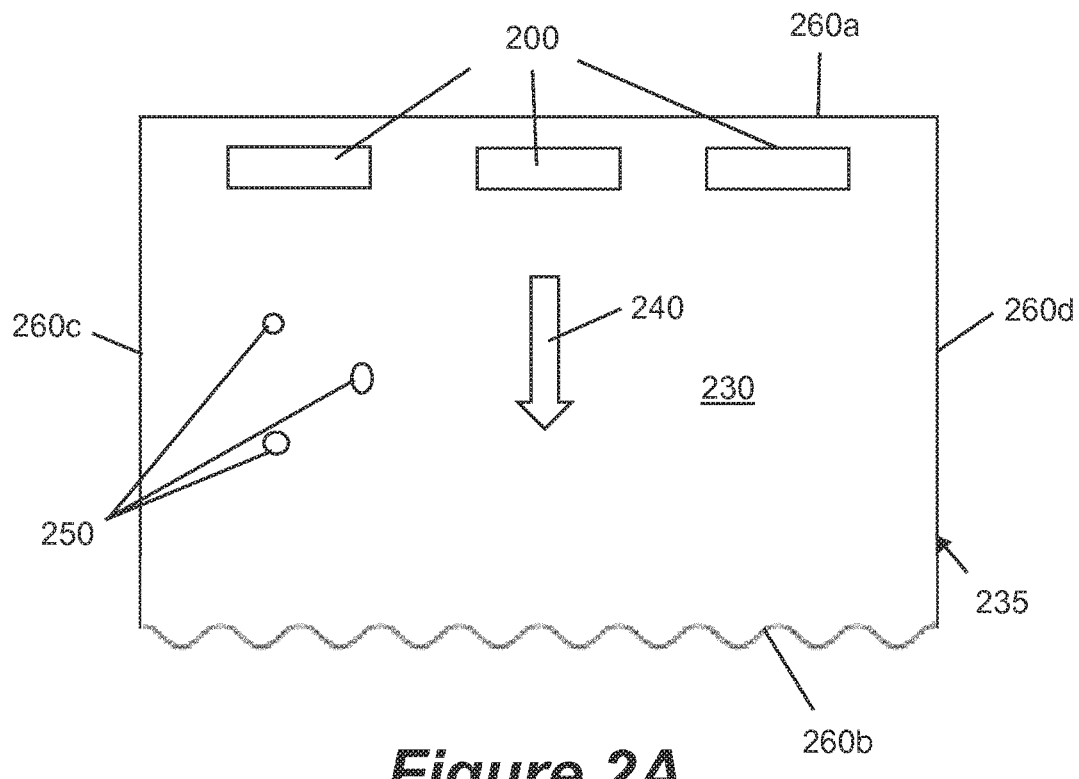
FIG. 2A is a schematic illustration of an example system comprising a plate and an apparatus for ultrasonically clearing droplets of fluid from the plate.

FIG. 2A shows an example system comprising a plate 235 having a bulk bounded by a first surface 230, a second surface (not visible) opposite to the first surface, and at least one edge 260 extending between the first and second surfaces. The at least one edge 260 comprises a first edge 260a, a second edge 260b opposite to the first edge 260a, and a pair of opposite side edges 260c and 260d. The plate 235 may have any of the features of the example plates described above.

The system further comprises an apparatus for ultrasonically clearing droplets 250 of fluid from the plate. The apparatus comprises one or more transducers 200 coupled to the plate, each of which is operable to generate ultrasonic waves which propagate through the plate 235; and a generator (not shown) for providing ultrasonic drive signals to the one or more transducers 200. In the illustrated example the one or more transducers 200 comprises three transducers 200 arranged in a line parallel with and adjacent to the first edge 260a. The one or more transducers are attached to the plate relatively close to the first edge 260a and relatively far away from the second edge 260b. The transducers 200 are configured to generate ultrasonic waves which propagate through the plate 235 in a propagation direction 240 toward the second edge 260b, at least in the region between the transducers 200 and the edge 260b. In some examples the transducers may be configured to additionally generate ultrasonic waves which propagate through the plate 235 in a secondary propagation direction opposite to the propagation direction 240 (which in such examples may be referred to as the main propagation direction), in a region between the transducers 200 and the first edge 260a. The apparatus may have any of the features of the example apparatus described above.

The plate 235 comprises one or more structures disposed in the path of ultrasonic waves generated by the transducers 200, configured to control the propagation of ultrasonic waves in the plate to achieve a predetermined amount of ultrasonic wave energy propagating in a direction opposite to the propagation direction of the ultrasonic waves generated by the one or more transducers. In the illustrated example, the one or more structures is comprised in the second edge 260b, which has a shape configured to scatter a predetermined portion of the incident ultrasonic waves.

In the illustrated example the second edge 260b is flat (rather than curved). A "flat" edge, as referred to herein, appears as a straight line when the plate is viewed in cross-section along a line between the first and second edges. A curved edge, by contrast, would appear as a curved line on such a cross-section. The second edge 260b of the particular example is perpendicular to the first 230 and second surfaces of the plate 235 (that is, the second edge 260b meets each of the first and second surfaces at a right angle). However; in other examples the second edge 260b may be angled with respect to the first and second surfaces of the plate. In one such example the second edge 260*b* may meet the first surface at an acute angle and may meet the second surface at an obtuse angle.

In the plane of the first surface 230 (and in the plane of the second surface) the edge 260*b* has a waveform shape such that the distance along the propagation direction 240 between the second edge 260*b* and the first edge 260*a* is variable along an axis perpendicular to the propagation direction. The waveform shape of the edge 260*b* means that the angle of incidence on the edge 260*b* of ultrasonic waves generated by the transducers 200 is variable along an axis perpendicular to the propagation direction 240. When a wave meets an interface or discontinuity (such as the edge 260*b*) at a right angle, most or all of the wave will be reflected back in the opposite direction. However; when a wave meets an interface at an acute angle to the normal (that is, its angle of incidence i is such that $90°>i>0°$) the wave will be reflected at an angle to the normal.

The effect of the waveform shape of the second edge 260*b* is that, across most of its width, an outgoing ultrasonic wavefront will meet the edge 260*b* at an acute angle of incidence. Only at the minima and maxima of the wavefront shape will the ultrasonic wavefront meet the edge 260*b* at a right angle. Consequently, most of the wave energy incident on the second edge 260*b* is scattered and does not return back to the transducers 260*b*. The amount of the incident ultrasonic wave energy which is reflected back in a direction opposite to the propagation direction is significantly smaller than would be the case with a normal plate edge. In other words, the second edge 260*b* is configured to reduce an amount of reflected ultrasonic wave energy propagating in a direction opposite to the main propagation direction, as compared to an amount of reflected ultrasonic wave energy that would propagate in the absence of a second edge having the particular configuration of the second edge 260*b*. The second edge 260*b* may therefore be considered to be an absorbing structure, since it effectively "absorbs" at least some of the ultrasonic wave energy incident on the second edge 260*b* that would otherwise be reflected back toward the transducers 200.

Figure 2B:
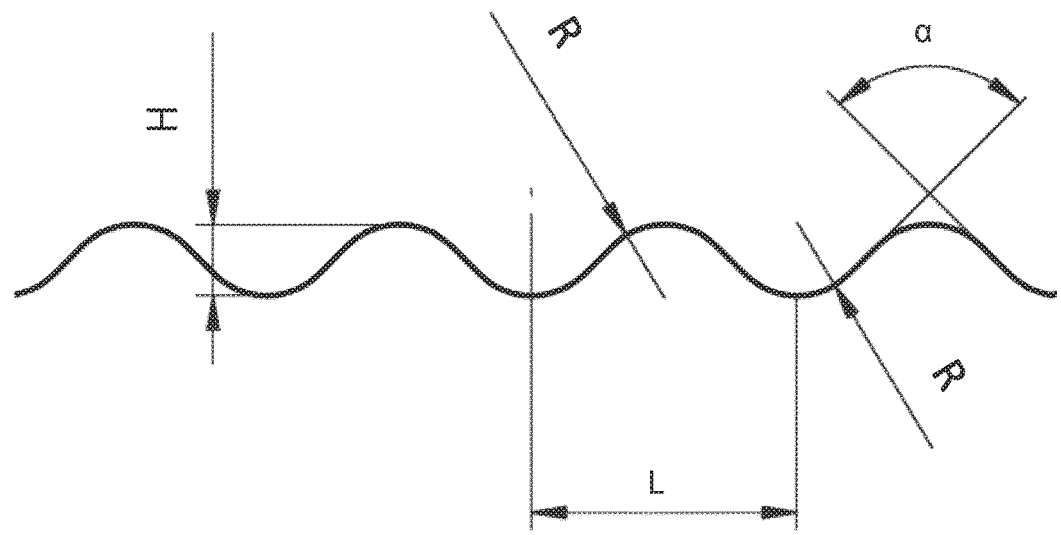
FIG. 2B is a schematic illustration of part of an edge of the plate of FIG. 2A.

The amount of the incident ultrasonic wave energy which is reflected back in a direction opposite to the propagation direction by the second edge 260*b* will depend on the exact shape of the waveform. This amount can therefore be selected or controlled by setting the values of various parameters of the waveform shape. The controllable parameters of the waveform shape are illustrated by FIG. 2B, and include the waveform height H, wavelength L, radius R, and slope angle a.

The parameters of the waveform shape may be set such that a predetermined amount of incident ultrasonic wave energy is absorbed (e.g. by being scattered) by the second edge 260*b*. Wave energy which does not return directly back to the transducers after encountering an absorbing structure is considered to be absorbed by that structure. In some examples the predetermined amount of absorbed incident ultrasonic wave energy is set so as to achieve a predetermined ratio of standing ultrasonic waves to travelling ultrasonic waves in the plate.

Other parameters of the shape of an edge or other type of absorbing structure which may be predetermined to achieve a predetermined effect on ultrasonic waves incident on the structure include height of the discontinuity in a direction perpendicular to the first surface and/or the second surface; length of the discontinuity in a direction perpendicular to the propagation direction of the ultrasonic waves generated by the one or more transducers; distance of the discontinuity from the one or more transducers, along a direction of propagation of the ultrasonic waves generated by the one or more transducers; angle of the discontinuity relative to the first surface and/or the second surface; angle of the discontinuity relative to the direction of propagation of the ultrasonic waves generated by the one or more transducers; shape of a surface of the discontinuity; and curvature of a surface of the discontinuity.

The edge 260*b* may be formed by cutting the edge of the plate 235 using any known cutting technique suitable for accurately cutting the type of material from which the plate 235 is comprised in any given implementation.

The edge 260*b* may be considered to be a discontinuity in the bulk of the plate which extends completely between the upper and lower surfaces of the plate. It is also possible for one or more discontinuities to exist in the bulk of the plate which do not extend completely between the upper and lower surfaces of the plate. Such a discontinuity may comprise, for example, a region of the bulk which has different material properties to an adjacent region, such that an interface capable of reflecting, scattering or otherwise affecting the propagation of ultrasonic waves exists between the region and the adjacent region. In an example, the first region may have a crystalline structure and the second region may have an amorphous structure, or vice versa. A discontinuity may comprise a void in the material forming the bulk of the plate. A discontinuity may comprise an inclusion (that is a piece of a different material) in the material forming the bulk of the plate.

A discontinuity which extends substantially between the upper and lower surfaces of the plate may affect waves propagating through the plate in an equivalent or similar manner to a discontinuity which extends completely between the upper and lower surfaces of the plate. For the purposes of the present disclosure, a discontinuity is considered to extend substantially between the upper and lower surfaces if it extends over a sufficient thickness of the plate that any difference in the effect on incident ultrasonic waves propagating in the plate as compared to the effect created by a discontinuity extending completely between the upper and lower surfaces is negligible.

Figure 2C:
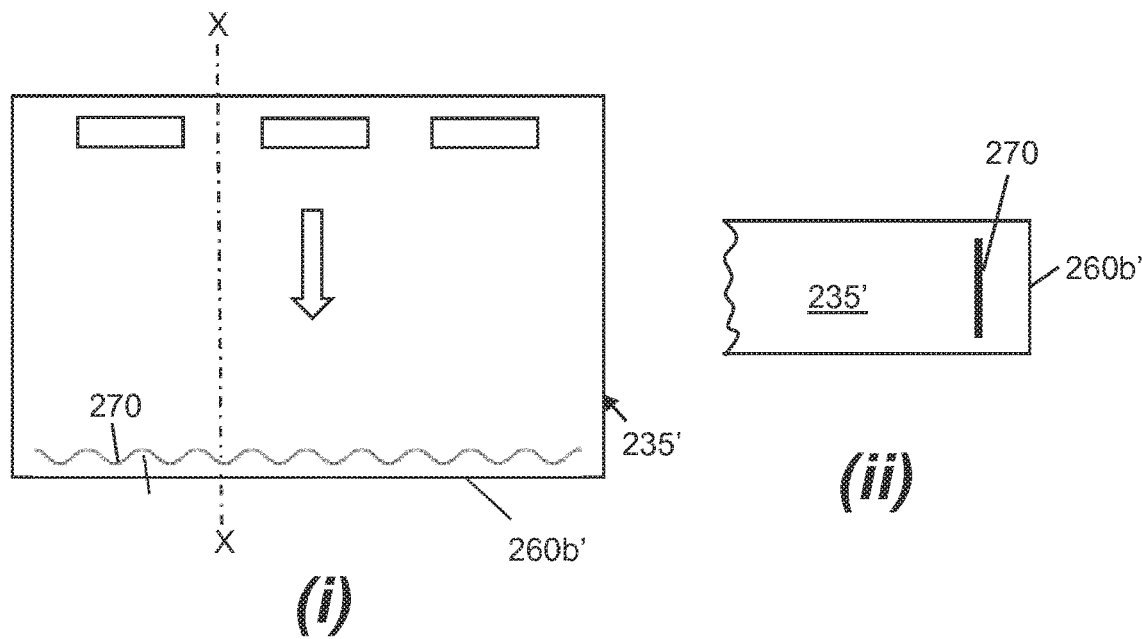
FIG. 2C is a schematic illustration of a further example system comprising a plate and an apparatus for ultrasonically clearing droplets of fluid from the plate.

A structure having an equivalent effect to the waveform edge 260*b* can therefore be created by creating a waveform-shaped discontinuity in the bulk of the plate material, which extends substantially between the upper and lower surfaces of the plate, but not completely between the upper and lower surfaces of the plate. FIG. 2C shows the system of FIG. 2B in which the plate 235 has been replaced by the plate 235'. The second edge 260*b*' of the plate 235' is a normal plate edge (i.e. an edge resulting from a standard manufacturing process for plates of the particular material type being used in a given implementation) without any special structure.

The plate 235' includes a discontinuity 270 near the second edge 260*b*' which extends substantially between the first and second surfaces, and has a length in a direction perpendicular to the propagation direction of the ultrasonic waves generated by the transducers. In some examples the discontinuity 270 extends completely between the first and second surfaces. Such a discontinuity may comprise, for example, a hole or slot through the plate, an inclusion, or any other type of region having different material properties from the rest of the plate. However; in the illustrated example the discontinuity 270 does not extend completely between the first and second surfaces of the plate 235', as is shown by FIG. 2C(ii), which is a partial cross-section through the plate 235' along the line X-X.

In the illustrated example the plate 235' comprises glass and the discontinuity 270 is formed by laser engraving. Laser engraved discontinuities suitable for use as the structures of the examples may comprise many small voids in the material, over the region of the discontinuity 270. The configuration of the discontinuity 270 is the same as the configuration of the second edge 260b of FIG. 2B, except that its length parallel to the thickness of the plate is slightly less than that of the second edge 260b, as is its length in the direction perpendicular to the propagation direction. However; at least in some examples the length of the discontinuity 270 parallel to the thickness of the plate may nevertheless be considered to be substantially equal to the thickness of the plate, and the length of the discontinuity 270 in the direction perpendicular to the propagation direction may nevertheless be considered to be substantially equal to a length of the plate in the direction perpendicular to the propagation direction. The waveform shape of the discontinuity 270 has the same features as the waveform shape of the second edge 260b. In some examples the discontinuity 270 may also have a non-negligible thickness in the propagation direction, which may depend on the technique used to create the discontinuity 270. This thickness will not generally affect the absorbing/scattering function of the discontinuity 270.

Figure 2D:
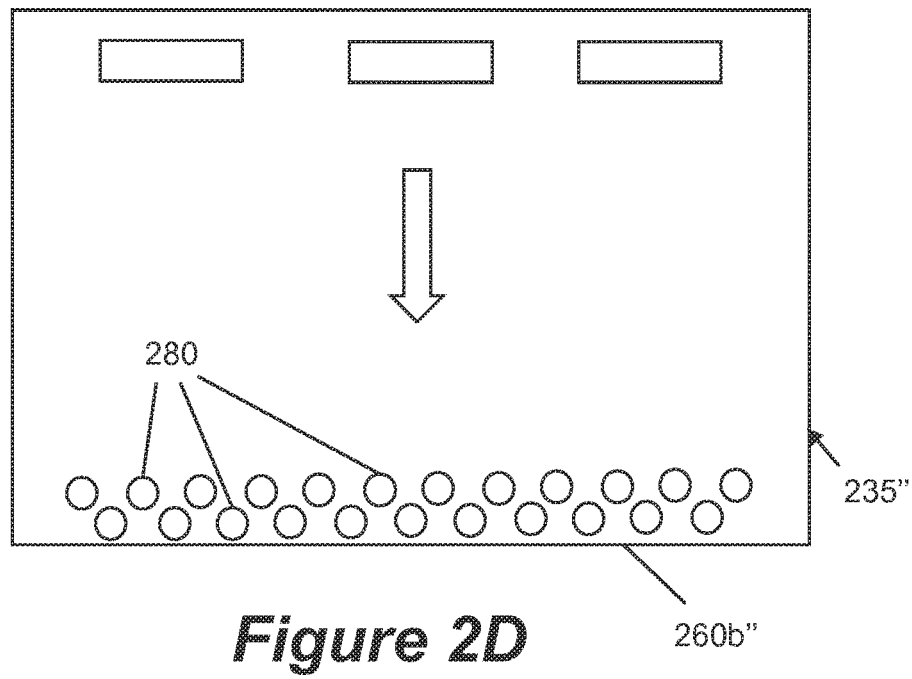
FIG. 2D is a schematic illustration of a further example system comprising a plate and an apparatus for ultrasonically clearing droplets of fluid from the plate.

FIG. 2D illustrates a further example absorbing structure. FIG. 2D shows the system of FIG. 2B in which the plate 235 has been replaced by the plate 235". The second edge 260b" of the plate 235" is a normal plate edge (i.e. an edge resulting from a standard manufacturing process for plates of the particular material type being used in a given implementation) without any special structure.

The plate 235" includes an absorbing structure near the second edge 260b". The absorbing structure has the form of a plurality of holes 280 in the bulk of the plate. Each hole 280 extends substantially between the first and second surfaces. In some examples (including the particular illustrated example) the holes 280 extend completely between the first and second surfaces. However; other examples are possible in which the holes do not extend completely between the first and second surfaces (and therefore comprise voids in the plate material). In some examples the holes may be filled with a material having different properties to the plate material. In an example in which the plate material is glass, the holes may be filled with an epoxy material.

The holes 280 are arranged in a predetermined pattern adjacent to the second edge 260b'. The holes 280 may be arranged to absorb (e.g. by scattering) at least some of the ultrasonic wave energy incident on the holes 280, in a manner similar to the waveform structures 260b and 270 described above. The holes 280 may thereby be configured to reduce the amount of the incident ultrasonic wave energy which is reflected back in a direction opposite to the propagation direction by the second edge 260b", as compared to the situation in the absence of the holes 280.

Figure 2E:
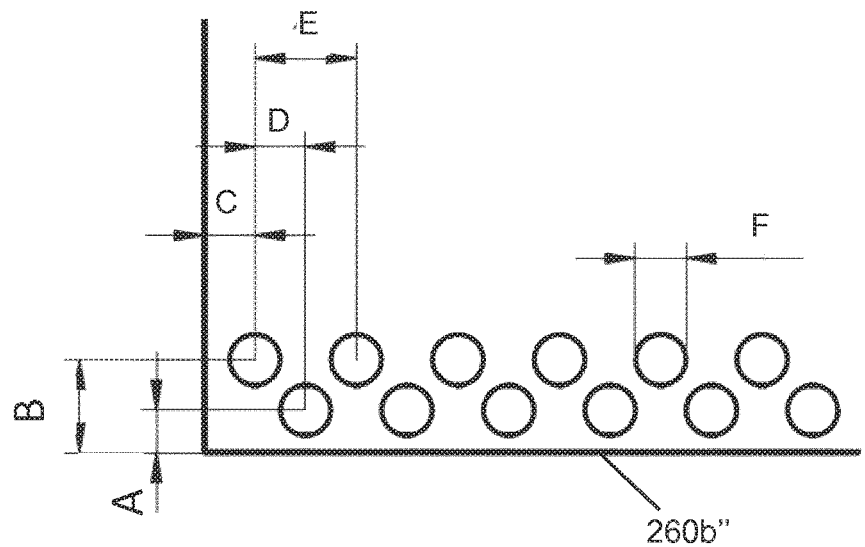
FIG. 2E is a schematic illustration of part of an edge of the plate of FIG. 2D.

The amount of incident ultrasonic wave energy which is absorbed by the holes 280 (and therefore the amount of incident ultrasonic wave energy which is reflected back to the transducers) will depend on the exact shape, size and arrangement of the holes 280. This amount can therefore be selected or controlled by setting the values of various parameters of the holes 280. The controllable parameters of the holes 280 are illustrated by FIG. 2E, and include distance A between the second edge 260b" and a hole adjacent the second edge; distance B between the centres of adjacent holes in the propagation direction; distance C between a side edge and the centre of a hole adjacent that side edge; distance D which is a distance in a direction perpendicular to the propagation direction between the centres of nearest neighbor holes (which may not be at the same distance from the second edge); distance E which is a distance in a direction perpendicular to the propagation direction between the centres of adjacent holes at the same distance from the second edge; and hole diameter F.

The parameters of the holes 280 may be set such that a predetermined amount of incident ultrasonic wave energy is absorbed (e.g. by being scattered) by the holes 280, and/or to achieve a predetermined ratio of standing ultrasonic waves to travelling ultrasonic waves in the plate.

The holes 280 may be formed by cutting the edge of the plate 235" using any known cutting technique suitable for accurately cutting the type of material from which the plate 235" is comprised in any given implementation.

In some examples transducers 260 are configured to generate ultrasonic waves propagating in a secondary propagation direction towards the first edge, as mentioned above. In some such examples, at least one amplifying structure may be provided, disposed at or near the first edge. Such an amplifying structure may be configured to increase an amount of reflected ultrasonic wave energy propagating in a direction opposite to the secondary propagation direction, as compared to an amount of reflected ultrasonic wave energy that would propagate in the absence of the at least one amplifying structure.

Figure 3:
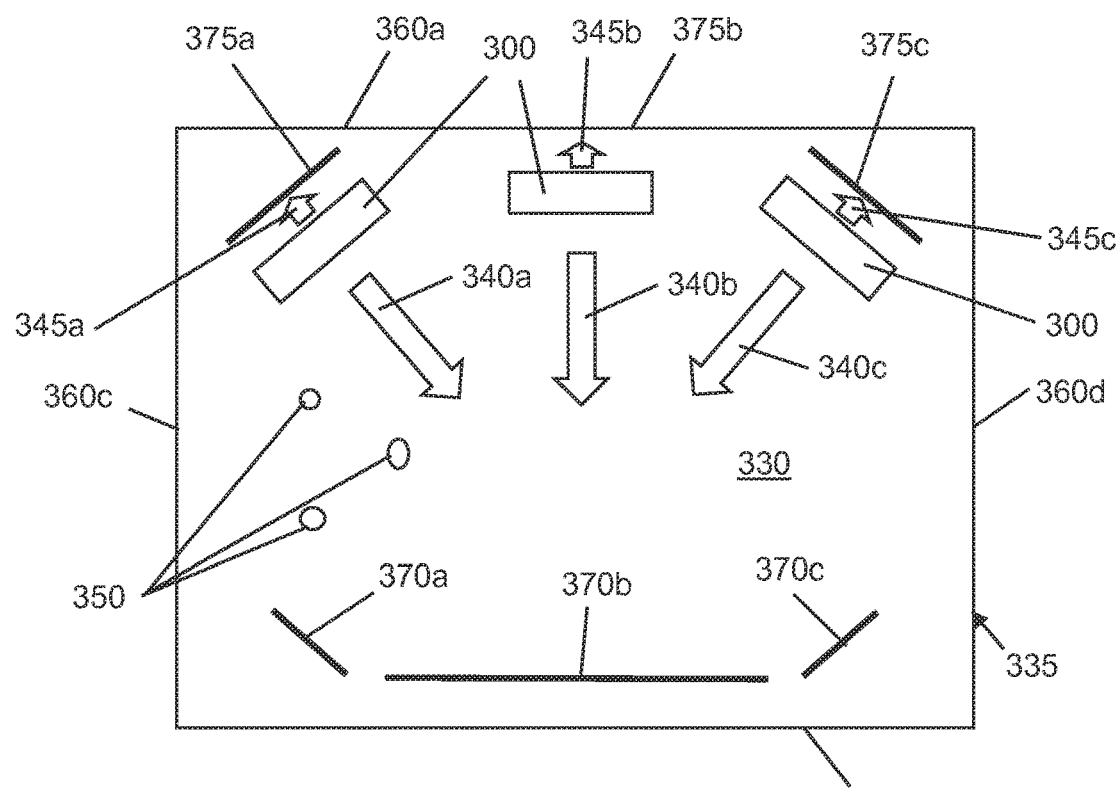
FIG. 3 is a schematic illustration of a further example system comprising a plate and an apparatus for ultrasonically clearing droplets of fluid from the plate.

FIG. 3 shows an example system comprising a plate 335 having a bulk bounded by a first surface 330, a second surface (not visible) opposite to the first surface, and at least one edge 360 extending between the first and second surfaces. The at least one edge 360 comprises a first edge 360a, a second edge 360b opposite to the first edge 360a, and a pair of opposite side edges 360c and 360d. The plate 335 may have any of the features of the example plates described above. The second edge 360b may, but need not, comprise an absorbing structure, such as any of the absorbing structures described above in relation to FIGS. 2A-E.

The system further comprises an apparatus for ultrasonically clearing droplets 350 of fluid from the plate. The apparatus comprises three transducers 300a-c coupled to the plate, each of which is operable to generate ultrasonic waves which propagate through the plate 335; and a generator (not shown) for providing ultrasonic drive signals to the transducers 300a-c. The apparatus has the same features as the apparatus of FIG. 2A described above, except for the particular arrangement of the transducers 300a-c. The transducers 300a-c are configured to generate ultrasonic waves which propagate through the plate 335 in the propagation directions 340a-c. The transducers 300a and 300c are angled towards the centre of the plate 335, such that the ultrasonic waves generated by the transducers 300a-c are focused on a central region of the plate 335.

Each of the transducers 300a-c is configured to generate ultrasonic waves which propagate through the plate 335 in a main propagation direction 340a-c, and also to generate waves which propagate through the plate 335 in a secondary propagation direction 375a-c opposite to the main propagation direction, in a region between the transducers 300 and the first edge 360a. The apparatus may have any of the features of the example apparatus described above.

The plate 335 comprises at least one amplifying structure disposed in the path of ultrasonic waves generated by the transducers 300 which are propagating in the secondary propagation direction 340b. The at least one amplifying structure is configured to control the propagation of ultrasonic waves in the plate to achieve a predetermined amount of ultrasonic wave energy propagating in a direction opposite to the secondary propagation direction 340*b*. In the illustrated example, a first amplifying structure 375*b* of the at least one amplifying structure is comprised in the first edge 360*a*, which has a shape configured to reflect a predetermined portion of the incident ultrasonic waves. Further amplifying structures 375*a* and 375*c* are provided in the path of the ultrasonic waves propagating from the transducers 300*a* and 300*c* in the secondary directions 345*a* and 345*c*. Each of the further amplifying structures comprises a discontinuity extending substantially between the first and second surfaces, and may be of an equivalent or similar type to the discontinuity 270 of FIG. 2C.

In the illustrated example the first edge 360*a* is flat. In particular, the first edge 360*a* is significantly flatter than a normal edge, as created by a standard cutting technique for the type of material from which the plate 335 is formed. The first edge 360*a* is perpendicular to each of the first and second surfaces of the plate 335. Providing an edge which is very flat and perpendicular to the plate surfaces can increase the amount of incident ultrasonic wave energy which is reflected back towards the transducers 300 by the first edge 360*a*. Increasing the amount of ultrasonic wave energy reflected by the first edge 360*a* can be advantageous because this reflected ultrasonic wave energy can constructively interfere with the ultrasonic waves emitted by the transducers in the main propagation direction 340*a* to increase the amplitude (and therefore the energy) of the ultrasonic waves propagating in the main propagation direction (which are the ultrasonic waves used to clear droplets of fluid from the plate). Similarly, the discontinuities 375*a* and 375*c* may be flat, so as to reflect a significant amount of incident ultrasonic wave energy, and may be perpendicular to each of the first and second surfaces of the plate 335. The discontinuity 375*a* is perpendicular to the secondary propagation direction 345*a* and the discontinuity 375*c* is perpendicular to the secondary propagation direction 345*c*.

The distance between the transducer 300*b* and the first edge 360*a* may be set so as to ensure such constructive interference. The optimum value of this distance will therefore depend on the particular wavelength and frequency of the ultrasonic waves emitted by the transducer 300*a*. The distance between the transducer 300*b* and the first edge 360*a* (and/or any other parameters of the configuration of the first edge 360*a* may be set such that the first edge 360*a* is configured to reflect a predetermined amount of incident ultrasonic wave energy. The predetermined amount of reflected incident ultrasonic energy may be set so as to achieve constructive interference between the ultrasonic waves reflected by the at least one amplifying structure and waves generated by the one or more transducers propagating in the plate in the main propagation direction between the one or more transducers and the second edge. The predetermined amount of reflected incident ultrasonic energy may be set so as to achieve a predetermined amplitude of waves propagating in the plate in the main propagation direction between the one or more transducers and the second edge. The distance between the transducers 300*a* and 300*c* and the discontinuities 375*a* and 375*c* respectively may be set based on similar or equivalent considerations, and in some examples may be the same as the distance between the transducer 300*b* and the first edge 360*a*.

The first edge 360*a* may be considered to be a planar discontinuity in the bulk of the plate which extends completely between the upper and lower surfaces of the plate. In alternative examples, an amplifying structure of equivalent or similar type to the further amplifying structures 375*a*, 375*c* may be provided in place of or in addition to the first edge 760*a*, to provide a similar or equivalent effect to the first edge 360*a*.

A structure disposed in the path of ultrasonic waves generated by one or more transducers, which is configured to control the propagation of ultrasonic waves in a plate to achieve a predetermined amount of ultrasonic wave energy propagating in a direction opposite to the propagation direction of the ultrasonic waves generated by the one or more transducers, may be used to alter the propagation direction of the ultrasonic waves propagating in the plate. A structure configured to alter the propagation direction of ultrasonic waves propagating in the plate may be considered to be a guiding structure.

The plate 335 of FIG. 3 comprises at least one guiding structure disposed in the path of ultrasonic waves generated by the transducers 300*a-c*. The at least one guiding structure is configured to alter the propagation direction of ultrasonic waves propagating in the plate 335, for example by controlling the propagation of ultrasonic waves in the plate to achieve a predetermined amount of ultrasonic wave energy propagating in a direction opposite to one or more of the propagation directions 340*a-c*. In the illustrated example, the one or more guiding structures comprises three guiding structures 370*a-c* disposed near the second edge 360*b*. Each of the guiding structures 370*a-c* comprises a discontinuity extending substantially between the first and second surfaces, and may be of an equivalent or similar type to the discontinuity 270 of FIG. 2C. However, the discontinuities 370*a-c* may be flat, so as to reflect a significant amount of incident ultrasonic wave energy.

The discontinuities 370*a* and 370*c* are angled toward the centre of the plate, such that ultrasonic waves reflected by the discontinuities 370*a* and 370*c* are focused on the central region of the plate 335. The discontinuities 370*a-c* are opposite the transducers 300*a-c* respectively, and are perpendicular to the propagation directions 340*a-c* respectively. The discontinuities 370*a-c* thereby cooperate with the transducers 300*a-c* to focus outgoing and reflected ultrasonic waves into the central region of the plate 335. Constructive interference may thereby be created in this central region, to increase the amplitude (and therefore the energy) of ultrasonic waves propagating in this region relative to the amplitude (and therefore the energy) of ultrasonic waves propagating in adjacent regions. The efficiency of droplet clearing in the central region may thereby be enhanced.

Figure 4:
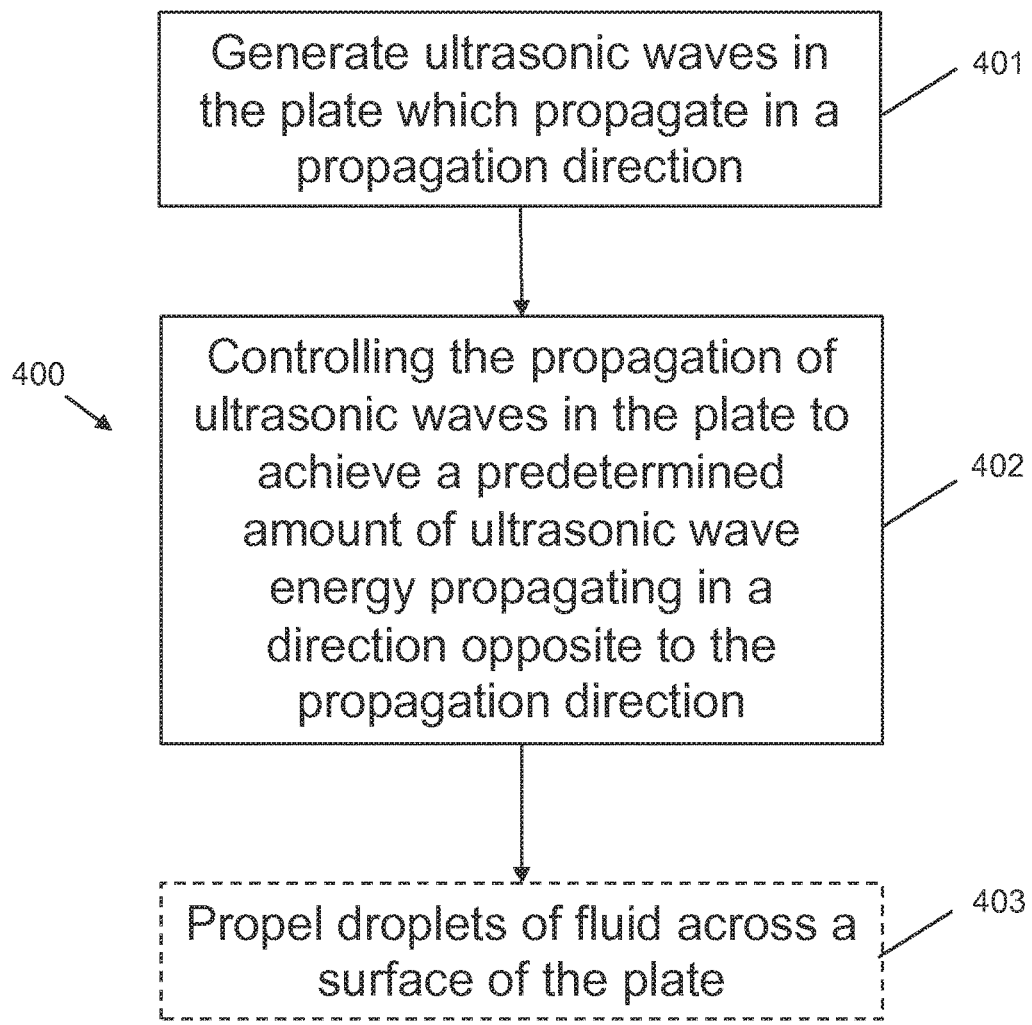
FIG. 4 is a flow chart illustrating an example method for clearing fluid from a plate.

FIG. 4 is a flow chart illustrating an example method 400 of clearing fluid from a plate having a bulk bounded by a first surface, a second surface opposite to the first surface, and at least one edge extending between the first and second surfaces. The plate may be, for example, any of the example plates described above, and the fluid may have any of the features of the fluids described in any of the examples above. In a particular example of the method, the plate comprises a machine tool window and the fluid is a cutting fluid.

In a first block 401, ultrasonic waves are generated in the plate using one or more ultrasonic transducers coupled to the plate. The one or more ultrasonic transducers may have any or all of the features of the example transducers described above. The ultrasonic waves may have any or all of the features of the ultrasonic waves described in any of the examples above. The ultrasonic waves may be generated such that the generated ultrasonic waves propagate in the plate in a propagation direction.

In a second block 402, the propagation of ultrasonic waves in the plate is controlled to achieve a predetermined amount of ultrasonic wave energy propagating in a direction opposite to the propagation direction. The controlling may be achieved, for example, by providing one or more structures disposed in the path of the ultrasonic waves. Such structures may comprise, for example, absorbing structures, guiding structures, and or amplifying structures. Such structures may comprise any of the example structures described above in relation to FIGS. 2-3. The controlling may result in increased efficiency of clearing droplets from the surface of the plate.

In some examples the method 400 may include an optional block, in which droplets of the fluid are propelled across a surface of the plate. Propelling droplets across the surface of the plate may be performed in any of the manners described above. Propelling the droplets across the surface of the plate may cause or contribute to clearing the droplets from the surface of the plate. Propelling droplets across the surface of the plate may be aided or enhanced by the controlling performed in block 402.

Figure 5:
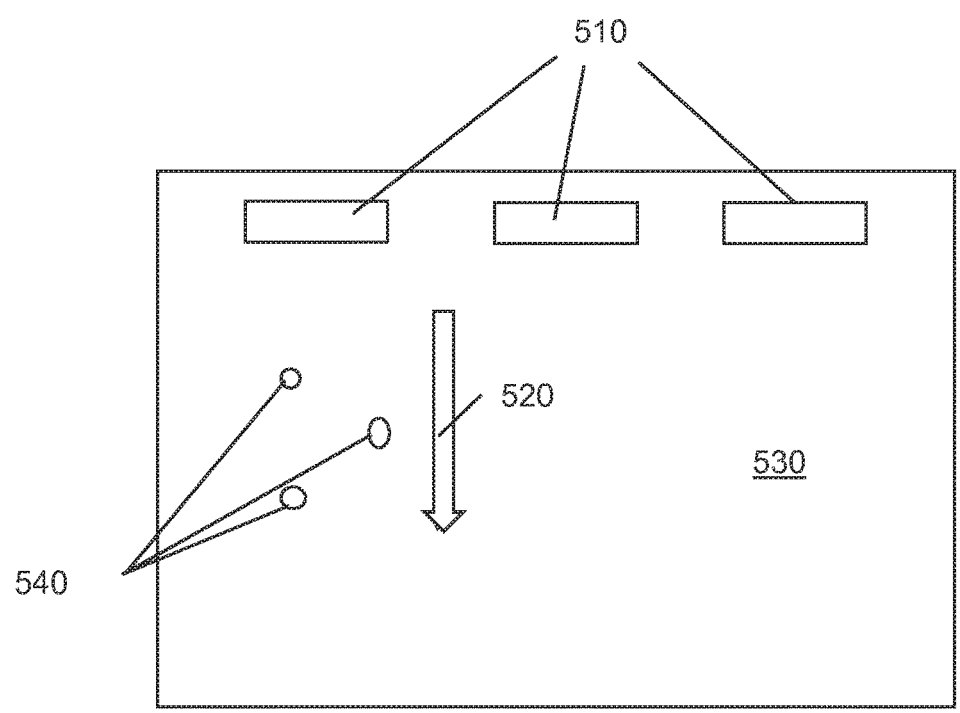
FIG. 5 is an example of a window of a machine tool incorporating an example of the present invention.

FIG. 5 schematically illustrates the clearing apparatus of the present invention installed on a machine tool window.

The example of FIG. 5 shows a plurality of transducers 510 attached to a peripheral region of a machine tool window 530. The transducers 510 are driven to emit ultrasonic waves 520 that are coupled to the window surface and propagate across the window surface. The direction of propagation in this example is in a direction that is perpendicular to the transducer electrodes. Droplets 540 on the surface of the window may be cleared according to methods described herein, for example by vibration, propulsion and/or atomisation. The transducers may be arranged along the edge of the window in a linear fashion such that ultrasonic waves may propagate across the entire window surface. The location of attachment of the transducers allow droplets to be cleared from any region of the window surface. The transducers are attached to the window to permit an unobstructed view through the window for the operator of the machine tool. In the example shown the transducers are attached at the top of the window. They may be elsewhere on the periphery of the window.

The examples of the present invention described above allow the use of a window which is much larger than the rotating disc. The examples have no mechanically moving parts, unlike the rotating disc.

The examples of the present invention described above allow the window to be sealed to the machine tool housing more simply because the window is fixed (i.e. it does not rotate).

The window may be of any suitable shape.

Although the examples discussed above have been primarily presented in the context of clearing cutting fluid from a machine tool window, the examples may also be implemented in any other context where it is desired to clear fluid from a plate. In particular, examples are envisaged in which the plate is a vehicle window (such as a windscreen, rear window, or side window) and the fluid is rain or another form of precipitation. In another example, the plate is a motorcycle visor and the fluid is rain or another form of precipitation.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system comprising:
   a plate having a bulk bounded by a first surface, a second surface opposite to the first surface, and at least one edge extending between the first and second surfaces; and
   one or more transducers coupled to the plate, each of the one or more transducers being operable to generate ultrasonic waves which propagate through the plate in a propagation direction, for ultrasonically clearing droplets of fluid from the plate;
   wherein the plate comprises one or more structures disposed in a path of ultrasonic waves generated by the one or more transducers, the one or more structures being configured to control propagation of ultrasonic waves in the plate to achieve a predetermined amount of ultrasonic wave energy propagating in a direction opposite to the propagation direction of the ultrasonic waves generated by the one or more transducers, wherein a value of one or more parameters of a shape of each of the one or more structures is predetermined to achieve a predetermined effect on ultrasonic waves incident on the structure.

2. The system according to claim 1, wherein the one or more parameters comprises any one or more of:
   height of the structure in a direction perpendicular to the first surface and/or the second surface;
   length of the structure in a direction perpendicular to the propagation direction of the ultrasonic waves generated by the one or more transducers;
   distance of the structure from the one or more transducers, along a direction of propagation of the ultrasonic waves generated by the one or more transducers;
   angle of the structure relative to the first surface and/or the second surface;
   angle of the structure relative to the direction of propagation of the ultrasonic waves generated by the one or more transducers;
   shape of a surface of the structure; or
   curvature of the surface of the structure.

3. The system according to claim 1, wherein the one or more structures is configured to scatter, absorb, and/or reflect at least some ultrasonic wave energy incident on the one or more structures.

4. The system according to claim 1, wherein the one or more structures comprises a discontinuity in the material of the plate, which extends substantially between the first and second surfaces, and has a length in a direction angled to the propagation direction of the ultrasonic waves generated by the one or more transducers.

5. The system according to claim 4, wherein the discontinuity comprises at least one of:
   an edge of the plate;
   a hole extending through the plate between the first and second surfaces;
   a void in the bulk of the plate; and
   a region of the bulk of the plate having different material properties to an immediately adjacent region.

6. The system according to claim 1, wherein at least one of the one or more structures has a length in a direction perpendicular to the propagation direction of the ultrasonic waves generated by the one or more transducers which is substantially equal to a length of the plate in the direction perpendicular to the propagation direction of the ultrasonic waves generated by the one or more transducers.

7. The system according to claim 1, wherein the plate comprises a first edge and a second edge opposite the first edge, wherein the one or more transducers are attached to the plate relatively close to the first edge and relatively far away from the second edge and are configured to generate ultrasonic waves which propagate in a main propagation direction towards the second edge.

8. The system according to claim 7, wherein the one or more structures comprises at least one absorbing structure, wherein the at least one absorbing structure is disposed at or near the second edge and is configured to reduce an amount of reflected ultrasonic wave energy propagating in a direction opposite to the main propagation direction, as compared to an amount of reflected ultrasonic wave energy that would propagate in the absence of the at least one absorbing structure.

9. The system according to claim 8, wherein the at least one absorbing structure is configured to scatter a predetermined amount of incident ultrasonic wave energy.

10. The system according to claim 9, wherein the predetermined amount of scattered incident ultrasonic energy is set so as to achieve a predetermined ratio of standing ultrasonic waves to travelling ultrasonic waves in the plate.

11. The system according to claim 8, wherein the at least one absorbing structure comprises a plurality of holes in the bulk of the plate, the holes extending between the first and second surfaces.

12. The system according to claim 11, wherein the holes are arranged in a predetermined pattern adjacent to the second edge.

13. The system according to claim 8, wherein the at least one absorbing structure comprises a discontinuity in the bulk of the plate, extending substantially between the first and second surfaces, the discontinuity having a waveform shape such that a distance along the propagation direction between the discontinuity and the first edge is variable along an axis perpendicular to the main propagation direction.

14. The system according to claim 13, wherein the shape of the discontinuity is such that an angle of incidence of ultrasonic waves generated by the one or more transducers is variable along a length of the discontinuity in the direction perpendicular to the main propagation direction.

15. The system according to claim 13, wherein the discontinuity comprises the second edge of the plate.

16. The system according to claim 7, wherein the one or more structures comprises at least one guiding structure which is disposed between the one or more transducers and the second edge and is configured to alter the propagation direction of ultrasonic waves propagated in the plate.

17. A window having a bulk bounded by a first surface, a second surface opposite to the first surface, and at least one edge extending between the first and second surfaces,
the window comprising one or more structures disposed in a path of ultrasonic waves propagating through the window for ultrasonically clearing droplets of fluid from the window, the one or more structures being configured to achieve a predetermined amount of ultrasonic wave energy propagating in a direction opposite to a propagation direction of the ultrasonic waves propagating through the window,
wherein the value of one or more parameters of a shape of each of the one or more structures is predetermined to achieve a predetermined effect on ultrasonic waves incident on the structure.

* * * * *